United States Patent
Döbbeler et al.

(10) Patent No.: US 8,412,474 B2
(45) Date of Patent: Apr. 2, 2013

(54) METHOD FOR DETERMINING A RADIATION MEASUREMENT FOR THERMAL RADIATION, ARC FURNACE, A SIGNAL PROCESSING DEVICE PROGRAMME CODE AND STORAGE MEDIUM FOR CARRYING OUT SAID METHOD

(75) Inventors: Arno Döbbeler, Herzogenaurach (DE); Klaus Krüger, Hamburg (DE); Thomas Matschullat, Eckental (DE); Detlef Rieger, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 12/865,164

(22) PCT Filed: Jan. 28, 2009

(86) PCT No.: PCT/EP2009/050925
§ 371 (c)(1),
(2), (4) Date: Jul. 29, 2010

(87) PCT Pub. No.: WO2009/095396
PCT Pub. Date: Aug. 6, 2009

(65) Prior Publication Data
US 2010/0332160 A1 Dec. 30, 2010

(30) Foreign Application Priority Data
Jan. 31, 2008 (DE) .......................... 10 2008 006 965

(51) Int. Cl.
*G06F 19/00* (2006.01)
*G01R 19/00* (2006.01)
*G01N 29/00* (2006.01)

(52) U.S. Cl. .......................................................... 702/56
(58) Field of Classification Search .................... 702/56, 702/64; 73/579; 700/300
See application file for complete search history.

(56) References Cited

U.S. PATENT DOCUMENTS
(Continued)

FOREIGN PATENT DOCUMENTS
CN 1379826 A 11/2002
CN 1429918 A 7/2003
(Continued)

OTHER PUBLICATIONS
German Office Action for Application No. 10 2008 006 958.2 (7 pages), Jan. 22, 2009.
(Continued)

*Primary Examiner* — Sujoy Kundu
(74) *Attorney, Agent, or Firm* — King & Spalding L.L.P.

(57) ABSTRACT

In a method, a variable characterising an operational state of an electrode of an arc furnace can be determined. An electrode flow guided to the electrode is detected in the method and the structure-borne noise oscillations are detected. From the detected electrode flow, a flow evaluation signal associated with the frequency range of the detected electrode flow is determined. From the detected structure-borne noise oscillations, an oscillation evaluation signal that is associated with a frequency range of the detected structure-borne noise oscillations is detected and a quotient from the oscillation evaluation signal and the flow evaluation signal is formed as a radiation measurement for at least one frequency common to the detected electrode flow and the detected structure-borne noise oscillation.

20 Claims, 2 Drawing Sheets

U.S. PATENT DOCUMENTS

| | | | | |
|---|---|---|---|---|
| 4,135,052 | A | * | 1/1979 | Stenkvist et al. ............. 373/108 |
| 4,656,331 | A | | 4/1987 | Lillquist et al. .......... 219/121.47 |
| 5,050,185 | A | | 9/1991 | Bourge et al. ................. 373/104 |
| 5,331,661 | A | | 7/1994 | Maguire et al. ............... 373/105 |
| 5,527,387 | A | | 6/1996 | Andersen et al. ............. 106/693 |
| 7,217,121 | B2 | * | 5/2007 | Thomson et al. ............... 431/12 |
| 2006/0060574 | A1 | | 3/2006 | Blankenship et al. ... 219/130.21 |
| 2008/0198894 | A1 | | 8/2008 | Matschullat ................... 373/104 |
| 2008/0285615 | A1 | | 11/2008 | Fink et al. ..................... 373/104 |
| 2008/0304538 | A1 | * | 12/2008 | Schubert ......................... 373/96 |
| 2008/0307926 | A1 | | 12/2008 | Matschullat ..................... 75/386 |

FOREIGN PATENT DOCUMENTS

| | | |
|---|---|---|
| DE | 4425089 | 1/1996 |
| DE | 29713666 | 11/1997 |
| DE | 19801295 | 7/1999 |
| DE | 102005034409 | 5/2006 |
| DE | 102005034378 | 1/2007 |
| EP | 0403413 | 6/1990 |
| EP | 0637634 | 8/1994 |
| FR | 2670571 | 6/1992 |
| JP | 2008115408 | 5/2008 |
| SU | 935534 | 6/1982 |
| WO | 2006131464 | 12/2006 |
| WO | 2007009861 A2 | 1/2007 |
| WO | 2007009924 | 1/2007 |

OTHER PUBLICATIONS

German Office Action for Application No. 10 2008 006 965.6 (6 pages), Jan. 27, 2009.

German Office Action for Application No. 10 2008 006 966.3 (6 pages), Dec. 17, 2008.

International Search Report and Written Opinion for Application No. PCT/EP2009/050241 (13 pages), Jun. 3, 2009.

International Search Report and Written Opinion for Application No. PCT/EP2009/050925 (12 pages), Apr. 27, 2009.

International Search Report and Written Opinion for Application No. PCT/EP2009/050243 (12 pages), Aug. 3, 2009.

Matschullat et al., "Foaming Slag and Scrap Melting Behavior in Electric Arc Furnace—A New and Very Precise Detection Method with Automatic Carbon Control" Archives of Metallurgy and Meterials of the Polish Academy of Sciences, Bd. 53, Nr.2, s. 399-403 XP002528409 (5 pages), Mar. 1, 2008.

Thomson. "Electric Furnace Arcs Screening—is with Frothing Agent of Slag Set by Measuring Acoustic Signals at Upper and Lower Limits of Frequencies Range" XP002401121 (1 page), Jan. 1, 1900.

Dmochowski "Hochstrommessungen bei Lichtbogenofen" in Elektrowarme International 39 (1981) B5, S.B. 254 bis B 261 (8 pages), Oct. 1, 1981.

* cited by examiner

METHOD FOR DETERMINING A RADIATION MEASUREMENT FOR THERMAL RADIATION, ARC FURNACE, A SIGNAL PROCESSING DEVICE PROGRAMME CODE AND STORAGE MEDIUM FOR CARRYING OUT SAID METHOD

CROSS-REFERENCE TO RELATED APPLICATIONS

This application is a U.S. National Stage Application of International Application No. PCT/EP2009/050925 filed Jan. 28, 2009, which designates the United States of America, and claims priority to DE Application No. 10 2008 006 965.5 filed Jan. 31, 2008. The contents of which are hereby incorporated by reference in their entirety.

TECHNICAL FIELD

The invention relates to a method for determining a radiation measure for thermal radiation which originates from an arc burning between an electrode and a material to be melted and strikes a boundary of the arc furnace, to a signal processing device, to a memory medium and to program code for carrying out the method.

BACKGROUND

An arc furnace is used to produce liquid metal, generally steel. The liquid metal is produced from solid material to be melted, for example scrap metal or reduced iron, together with further additives. This is done by using one or more electrodes to introduce energy into the arc furnace in order to melt the material to be melted, generally in the form of an arc between an electrode and the material to be melted. In order to allow the melting process to be carried out as efficiently as possible, as much as possible of the energy produced by the arc should be introduced into the material to be melted. In this case, the material to be melted means solid material, liquid metal and/or slag, as well, to be melted.

However, the specified method of operation of present-day arc furnaces means that the arc burns freely during the melting process. This means that a large proportion of the thermal radiation which originates from the arc formed between an electrode and the material to be melted strikes a boundary of the arc furnace, in particular a cooled wall of the arc furnace. This increases the energy consumption of the furnace, on the one hand because only a small amount of the energy in the arc furnace is introduced into the material to be melted, while on the other hand the cooling power to cool the furnace walls may have to be increased.

SUMMARY

According to various embodiments, a method of the type mentioned initially can be provided, by means of which it is possible to determine a variable which characterizes an operating state of an electrode of an arc furnace. According to other embodiments, an arc furnace can be provided which is suitable for carrying out the method, as well as a signal processing device which carries out the method, a memory medium and program code for this purpose.

According to an embodiment, in a method for determining a radiation measure for thermal radiation which originates from an arc burning between an electrode and a material to be melted and strikes a boundary of the arc furnace, an electrode current which is supplied to the electrode is detected, structure-borne sound oscillations of the arc furnace are detected, a current evaluation signal, which is associated with a frequency range of the detected electrode current, is determined from the detected electrode current, an oscillation evaluation signal which is associated with a frequency range of the detected structure-borne sound oscillations is determined from the detected structure-borne sound oscillations, and a quotient of the oscillation evaluation signal and current evaluation signal is formed as a radiation measure for at least one frequency which is common to the detected electrode current and the detected structure-borne sound oscillations.

According to a further embodiment, a sum of quotients which are formed for a plurality of common frequencies, can be formed as the radiation measure. According to a further embodiment, at least one of the plurality of common frequencies can be selected from the group which consists of the multiples of twice the operating frequency of the electrode. According to a further embodiment, the frequency-dependent current evaluation signal can be based on $$I_n(\omega) \propto \int_a^b I(t)^n e^{-i\omega t} dt$$

or on $$I_n(\omega) \propto \int_a^b |I(t)|^n e^{-i\omega t} dt$$

where n is a parameter, n∈1, 2, 3, . . .
where i: imaginary unit
where e: Euler's number
where t: time
where $\omega$: angular frequency of the electrode current
where I(t): time-dependent, detected electrode current
where I($\omega$): frequency-dependent electrode current
where a: start of the integration interval
where b: end of the integration interval.

According to a further embodiment, n for $$I_n(\omega) \propto \int_a^b I(t)^n e^{-i\omega t} dt$$

can be selected to be equal to two. According to a further embodiment, n for $$I_n(\omega) \propto \int_a^b I(t)^n e^{-i\omega t} dt$$

can be selected to be equal to one. According to a further embodiment, the frequency-dependent current evaluation signal can be formed as the frequency-dependent absolute magnitude $|I_n(\omega)| = \sqrt{I_n(\omega) \cdot I_n(\omega)^*}$ of the function $I_n(\omega)$. According to a further embodiment, the frequency-dependent oscillation evaluation signal can be formed as the frequency-dependent absolute magnitude $|K_n(\omega)| = \sqrt{K_n(\omega) \cdot K_n(\omega)^*}$ of the function:

$$K_n(\omega) \propto \int_a^b K(t)^n e^{i\omega t} dt$$

where n is a parameter, n∈1, 2, 3, . . .
where i: imaginary unit
where e: Euler's number
where t: time
where ω: angular frequency of the detected structure-borne sound oscillations
where K(t): time-dependent, detected structure-borne sound signal
where K(ω): frequency-dependent structure-borne sound signal
where K(ω)*: complex-conjugate structure-borne sound signal relating to K(ω)
where a: start of the integration interval
where b: end of the integration interval.

According to a further embodiment, the radiation measure can be used for controlling and/or regulating a process variable of the arc furnace.

According to another embodiment, a signal processing device for an arc furnace, may comprise a machine-legible program code which has control commands which cause the signal processing device to carry out a method as described above.

According to yet another embodiment, a machine-legible program code for a signal processing device for an arc furnace may have control commands which cause the signal processing device to carry out the method as described above.

According to yet another embodiment, a memory medium may have a machine-legible program code as described above stored in it.

According to yet another embodiment, an arc furnace may have at least one electrode, having an electrode current detection device for detecting an electrode current which is supplied to the at least one electrode, having structure-borne sound sensors for detecting structure-borne sound in a boundary of the arc furnace, and may have a signal processing device as described above, wherein the electrode current detection device (13a, 13b, 13c) and the structure-borne sound sensors are operatively connected to the signal processing device.

According to a further embodiment of the arc furnace, the signal processing device can be operatively connected to a control and/or regulating device for determining a manipulated variable for a process variable of the arc furnace from the radiation measure.

BRIEF DESCRIPTION OF THE DRAWINGS

Further advantages of the various embodiments will be explained in more detail in the following text with reference to schematic drawings, in which.

DETAILED DESCRIPTION

Figure 1:
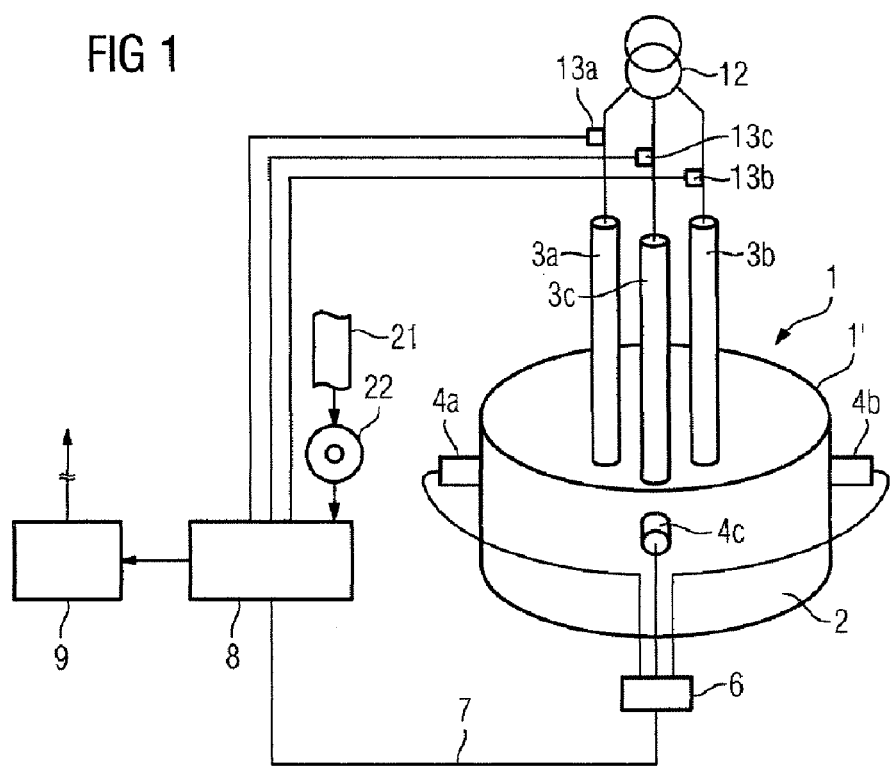
FIG. 1 shows a schematic illustration of an arc furnace for determining a radiation measure according to various embodiments.

According to various embodiments, an electrode current which is supplied to the electrode is detected, structure-borne sound oscillations of the arc furnace are detected, a current evaluation signal, which is associated with a frequency range of the detected electrode current, is determined from the detected electrode current, wherein an oscillation evaluation signal which is associated with a frequency range of the detected structure-borne sound oscillations is determined from the detected structure-borne sound oscillations, and a quotient of the oscillation evaluation signal and current evaluation signal is formed as a measure for at least one frequency which is common to the detected electrode current and the detected structure-borne sound oscillations. The quotient of the oscillation evaluation signal and the current evaluation signal can be understood as meaning both the quotient formed from the oscillation evaluation signal divided by the current evaluation signal and the quotient formed from the current evaluation signal divided by the oscillation evaluation signal. These two quotients can be considered to be equivalent for determining the radiation measure. In particular, the radiation measure characterizes the radiation power which originates from the arc and strikes the boundary of the arc furnace. The radiation measure can either be used such that it rises as the radiation power to a boundary of the arc furnace rises, or such that it rises as the radiation power to the boundary of the arc furnace falls. In the latter case, the radiation measure can map the envelope of the arc through the material to be melted. Thermal radiation means electromagnetic radiation which is thermally effective, that is to say it results in a temperature change at the boundary which it strikes.

It is therefore possible to determine an envelope of an arc through foamed slag or foaming slag, and/or solid material to be melted. If the arc is completely enveloped by scrap metal or foamed slag, the amount of energy introduced by the arc into the material to be melted is particularly good. This is because the thermal radiation of the arc, predominantly infrared radiation, directly strikes the material to be melted arranged adjacent to the arc, and is at least partially absorbed by it. In consequence, in particular, cooled wall sections of an arc furnace are protected against excessive heating, and the amount of energy introduced into the material to be melted is improved. Material to be melted can thus be provided in a liquid phase more quickly, thus allowing the liquid metal to be tapped off from the arc furnace more quickly. This in turn leads to an increase in the throughput of the arc furnace.

According to an embodiment, a sum of quotients which are formed for a plurality of common frequencies, is formed as the radiation measure. A quotient is therefore in each case formed from the oscillation evaluation signal and the current evaluation signal for one specific, common frequency. This is done for a plurality of frequencies. Quotients are therefore formed, for example, from the oscillation evaluation signal and the current evaluation signal for 100 Hz, 300 Hz and 500 Hz, in each case. These are then added up, and the sum is used as the radiation measure. This makes it possible to achieve particularly high accuracy for the radiation measure which characterizes the state variable of the electrode, in particular the envelope of the arc burning on the electrode.

According to a further embodiment, at least one of the plurality of common frequencies is selected from the group which consists of the multiples of twice the operating frequency of the electrode. These frequencies in particular lead to a further increase in the accuracy of the radiation measure. In this case, it is preferable to use frequencies which are m times twice the operating frequency of the electrode, where m is equal to 1, 2, 3, 4, 5 or 6. The operating frequency is the frequency at which an electrical variable, for example the voltage or the electrode current, is applied to an electrode. The operating frequency is generally the power supply system frequency of the power supply system from which the electrode is fed.

According to a further embodiment, the frequency-dependent current evaluation signal is based on $$I_n(\omega) \propto \int_a^b I(t)^n e^{-i\omega t} dt$$

or on $$I_n(\omega) \propto \int_a^b |I(t)|^n e^{-i\omega t} dt$$

where n: parameter, n∈1, 2, 3, ..., where i: imaginary unit, where e: Euler's number, where t: time, where ω: angular frequency of the electro current, where I(t): time-dependent, detected electrode current, where I(ω): frequency-dependent electrode current, where a: start of the integration interval, where b: end of the integration interval. By way of example, a can be chosen to be minus infinity, and b to be plus infinity. Alternatively, finite interval limits can also be selected.

It is particularly advantageous that n for $$I_n(\omega) \propto \int_a^b I(t)^n e^{-i\omega t} dt,$$

is selected to be equal to two. This results in the square of the electrode current, which can be determined particularly easily. It is likewise advantageous that n for $$I_n(\omega) \propto \int_a^b I(t)^n e^{-i\omega t} dt,$$

is selected to be equal to one. The magnitude of the electrode current is therefore used to determine the radiation measure.

In particular, it is advantageous to use the absolute magnitude of the Fourier transform $I_{n(\omega)}$ as the frequency-dependent current evaluation signal, that is to say: $|I_n(\omega)| \propto \sqrt{I_n(\omega) I^*_n(\omega)}$.

According to a further embodiment, the frequency-dependent oscillation evaluation signal is formed as the frequency-dependent absolute magnitude or magnitude $|K_n(\omega)| = \sqrt{K_n(\omega) \cdot K_n(\omega)^*}$ of the function:

$$K_n(\omega) \propto \int_a^b K(t)^n e^{-i\omega t} dt$$

where n: parameter, n∈1, 2, 3, ..., where i: imaginary unit where e: Euler's number, where t: time, where ω: angular frequency of the detected structure-borne sound oscillations, where K(t): time-dependent, detected structure-borne sound signal, where K(ω): frequency-dependent structure-borne signal, where K(ω)*: complex-conjugate structure-borne sound signal relating to K(ω), where a: start of the integration interval, where b: end of the integration interval. The absolute magnitude of the complex oscillation evaluation signal can be used particularly advantageously for determining the radiation measure, since it produces particularly good results. It is advantageous to set n to be equal to one.

According to a further embodiment, the radiation measure is used for controlling and/or regulating at least a process variable of the arc furnace. A process variable means any adjustable physical variable which influences, preferably substantially, the process of melting a solid material in an arc furnace. The use of the radiation measure for controlling and/or regulating the arc furnace makes it possible to further increase the level of automation of the arc furnace and therefore to further improve the operation of the arc furnace. It is particularly advantageous to provide a method for operating an arc furnace having at least one electrode, wherein a solid material which is supplied to the arc furnace is melted by means of an arc formed by the at least one electrode, wherein a radiation measure is determined, and a process variable of the arc furnace is controlled and/or regulated on the basis of the determined radiation measure.

The method for determining a radiation measure can advantageously be combined with further methods for determining state variables in an arc furnace. It is thus possible to match the operation of an arc furnace dynamically and as comprehensively as possible to state variables which are in each case present in the arc furnace in the steel production process or melting process.

According to further embodiments, a signal processing device for an arc furnace has a machine-legible program code which has control commands which cause the signal processing device to carry out a method as described above. The radiation measure is therefore determined automatically, and a process variable of the arc furnace can be controlled and/or regulated directly as required on the basis of the radiation measure. Alternatively, manipulated variables for the arc furnace can also be adjusted manually by the operator on the basis of the determined radiation measure, which is preferably output, in particular output in graphic form.

According to further embodiments, an arc furnace having at least one electrode, has an electrode current detection device for detecting an electrode current which is supplied to the at least one electrode, having structure-borne sound sensors for detecting structure-borne sound in a boundary of the arc furnace, and having a signal processing device as described above, wherein the electrode current detection device and the structure-borne sound sensors are operatively connected to the signal processing device. This makes it possible to provide an arc furnace which can be operated better on the basis of a determined radiation measure, because a variable which characterizes an operating state of an electrode of the arc furnace is determined.

According to a further embodiment, the signal processing device is operatively connected to a control and/or regulating device for determining a manipulated variable for at least one process variable of the arc furnace from the radiation measure. The signal processing device and the control and/or regulating device can be physically combined, or can be formed separately from one another. The interaction of these two devices allows improved, automated operation of the arc furnace. In particular, the position control of the electrodes, the amount of energy introduced, the feeding of additives, the prediction of charging and/or tapping times can be improved or made more objective. The expression "a manipulated variable for a process variable" means any variable by means of which a process variable can be adjusted indirectly or directly.

The method for determining a radiation measure in an arc furnace can advantageously be combined with further methods for determining state variables in an arc furnace. It is thus possible to match the operation of an arc furnace dynamically and as extensively as possible to state variables which are in each case present in the arc furnace during the steel production process or melting process for producing a liquid metal bath or steel bath.

FIG. 1 shows an electrical arc furnace 1 having a plurality of electrodes 3a, 3b, 3c which are connected via power supply lines to a power supply device 12. The power supply device 12 preferably has a furnace transformer.

Charging materials, such as scrap steel and/or iron and/or direct-reduced iron, possibly with alloying means and/or additives, are melted with the aid of three electrodes 3a, 3b, 3c in the electrical arc furnace 1. Until now, it has not been precisely known how much of the energy emitted from an arc is introduced in the material to be melted located in the electrical arc furnace. In consequence, it is possible for the arc of an electrode 3a, 3b and/or 3c to burn freely, and thus for a large proportion of the energy introduced to pass to the boundary of the electrical arc furnace, in particular to the side walls 2, which are generally cooled, of the furnace vessel 1'. This can be the case, for example, after scrap metal collapses, or if the foamed slag height is too low. However, free burning of the arc is particularly undesirable for energy reasons and should therefore be identified as early as possible in order to counteract it. In particular, the method according to various embodiments allows free burning of the arc to be prevented by using the determined radiation measure to regulate the electrode position.

In the illustrated example, electrode current detection devices 13a, 13b, 13c are provided on the power supply lines to the electrodes 3a, 3b, 3c and allow the current and/or voltage therein and the energy supplied to the electrodes 3a, 3b, 3c to be measured. The electrode current detection devices 13a, 13b, 13c are operatively connected to a signal processing device 8. This means that signals are transmitted with or without contact between at least one electrode current detection device 13a, 13b, 13c and the signal processing device 8. In this case, the transmitted signals represent the electrode current detected over time. Signals such as these are preferably transmitted continuously and for all the electrode currents supplied to the electrodes 3a, 3b, 3c.

Structure-borne sound sensors 4a, 4b, 4c for detecting oscillations on the furnace vessel 1 are arranged on a wall 2 and/or on the panels of the furnace vessel 1', that is to say on the outer boundary of the furnace vessel 1'. The structure-borne sound sensors 4a, 4b, 4c can be arranged connected indirectly and/or directly to the furnace vessel 1' and/or to the wall 2 of the furnace vessel 1'. The structure-borne sound sensors 4a, 4b, 4c for measuring structure-borne sound oscillations are preferably arranged at a point which can oscillate on the wall 2, directly opposite the respective electrode 3a, 3b, 3c, and at least as many structure-borne sound sensors 4a, 4b, 4c are preferably provided as there are electrodes 3a, 3b, 3c.

The structure-borne sound sensors 4a, 4b, 4c are operatively connected to a signal processing device 8. This means that signals are transmitted with or without contact between at least one structure-borne sound sensor 4a, 4b, 4c and the signal processing device 8. The transmitted signals in this case represent the structure-borne sound oscillations of the wall 2 of the furnace vessel at the location of the structure-borne sound sensors 4a, 4b, 4c, detected over time. Signals such as these are preferably transmitted continuously.

The signals which are transmitted from the structure-borne sound sensors 4a, 4b, 4c to the signal processing device 8 are preferably passed at least partially via an optical waveguide 7. At least one optical device 6 is arranged between the optical waveguide 7 and the structure-borne sound sensors 4, 4a, 4b, 4c and serves to amplify and/or convert signals from the one or more structure-borne sound sensors 4a, 4b, 4c. Signal lines can be provided in the immediate vicinity of the furnace vessel 1', or in some circumstances also directly on the furnace vessel 1', which signal lines are used to pass signals from the structure-borne sound sensors 4a, 4b, 4c. The signal lines are preferably routed such that they are protected against heat, electromagnetic fields, mechanical loading and/or other loads.

The radiation measure is determined in the signal processing device 8 as will be explained in the following text with reference to FIG. 2 to FIG. 5. The determined radiation measure can then be transmitted to a regulating device 9, which uses the radiation measure to adjust a manipulated variable for a process variable of the electrical arc furnace 1. For example, the electrode position, in particular the vertical position, of the electrodes 3a, 3b, 3c can be regulated with the aid of the radiation measure such that the arcs which originate from the electrodes 3a, 3b, 3c are essentially permanently enveloped by scrap metal and/or foamed slag. Furthermore, it is possible to regulate the arc itself, and therefore the amount of energy introduced for the respective electrode, as a function of the determined radiation measure. If required, the addition of media, for example to promote foamed slag formation or for conditioning of the material to be melted, can be regulated in the electrical arc furnace 1 on the basis of the determined radiation measure.

Figure 2:
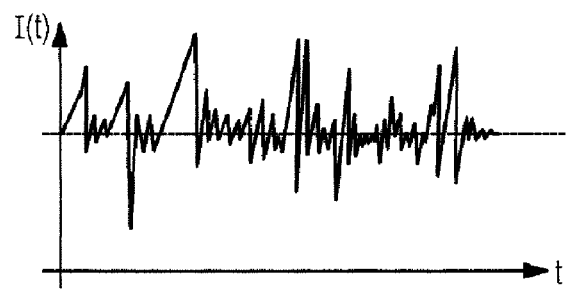
FIG. 2 shows an illustration of a detected electrode current signal over time.

By way of example, the determination of the radiation measure will be explained in conjunction with FIG. 1, using the example of the electrode 3a in the electrical arc furnace 1. A radiation measure is preferably determined continuously during operation of the electrical arc furnace 1, and for all electrodes 3a, 3b and 3c. The electrode current detected over time for an electrode 3a, detected by the electrode current detection device 13a, is illustrated in FIG. 2.

The measured or detected electrode current is digitized, if the data has not yet been digitized. This is done using a sufficiently high sampling rate, for example 12 000 samples per second. The magnitude of the sampling rate is dependent on the rate of change of the electrode current that occurs over time: $dI((t)/dt$. In this case, $I(t)$ is the electrode current signal, which varies over time and is associated with the electrode current, and t is the time. The more quickly the electrode current varies over time, the higher the sampling rate which must in general be selected in order to detect the changes in the electrode current with sufficient accuracy. If required, the sampling rate can be adjusted as a function of electrode current changes to be expected. This statement applies analogously to the detected structure-borne sound oscillations in the wall 2 detected by the structure-borne sound sensors 4a, 4b, 4c. A time-resolved structure-borne sound oscillation signal $K(t)$ is thus detected, and is illustrated by way of example in FIG. 3.

Before the signal processing device 8 is used to evaluate the method, the method is supplied, preferably once, in the form of a machine-legible program code 21 by means of a memory medium 22, for example a compact disc, and is stored in the programmable logic signal processing device 8. The signal processing device 8 is thus prepared to carry out a method for determining a radiation measure in an electrical arc furnace.

The electrode current signals $I(t)$ which represent the electrode current detected by means of the electrode current detection device 13a are supplied to the prepared signal processing device 8. In the signal processing device 8, the electrode current signal I(t) is converted to the square of the electrode current signal $I^2(t)$, and the squared electrode current signal $I^2(t)$ is transformed from the time domain to the frequency domain, thus resulting in a squared electrode current signal $I^2(f)$, which is split into frequency components, wherein f is a frequency. As an equivalent to $I^2(f)$, it is possible to determine $I^2(\omega)$, where $\omega=2\pi f$. The squared electrode current signal $I^2(t)$ is preferably transformed from the time domain to the frequency domain by Fourier transformation. However, other transformation methods are also suitable, if required, to convert a signal from a time domain to a frequency domain. These are likewise available to a person skilled in the art. Alternatively, it is also possible to use the magnitude of I(t), that is to say |I(t)|.

A frequency range to be evaluated is now defined from the frequency spectrum of the transformed squared electrode current signal $I^2(t)$. The frequency range to be evaluated in this case preferably consists of a plurality of discrete frequencies, specifically of the multiples of twice the operating frequency $f_o$ of the electrode, preferably using the multiples $2f_o$, $3f_o$, $4f_o$, $5f_o$ and $6f_o$. In Europe, the operating frequency of the electrodes is generally the same as the power supply system frequency, that is to say 50 Hz. At least one frequency from the group: 200 Hz, 300 Hz, 400 Hz, 500 Hz or 600 Hz is therefore preferably used for quotient formation. In other countries, in which the electrode operating frequency or the power supply system frequency is other than 50 Hz, an analogous procedure can be adopted. The transformed squared electrode current component relating to these frequencies is used to determine the radiation measure. In the present exemplary embodiment, the current evaluation signal is therefore formed from the absolute magnitude of the Fourier-transformed, squared electrode current signal.

Figure 3:
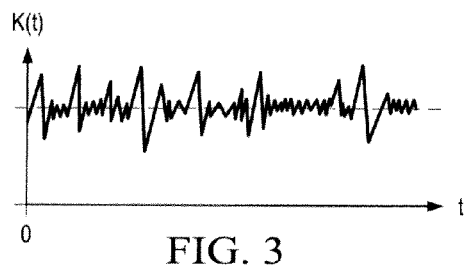
FIG. 3 shows an illustration of a detected structure-borne sound signal over time.

The structure-borne sound oscillation signals K(t) detected by means of the structure-borne sound sensors 4a, 4b, 4c are supplied to the signal processing device 8, and are likewise converted from the time domain to the frequency domain. The detected time-resolved structure-borne sound oscillation signal K(t) is illustrated in FIG. 3. If required, powers other than one of the structure-borne sound oscillation signal K(t) can also be used to determine the radiation measure. The structure-borne sound oscillation signal K(t) is likewise preferably converted from the time domain to the frequency domain by means of Fourier transformation. A frequency range to be evaluated is now defined from the frequency spectrum of the transformed structure-borne sound oscillation signal K(t), and this frequency range is identical to the frequency range to be evaluated of the squared electrode current $I^2(t)$. The magnitude or the absolute magnitude of the transformed structure-borne sound oscillation signal component is now determined for these frequencies, in the exemplary embodiment $3f_o$, $4f_o$, $5f_o$ and $6f_o$. The oscillation evaluation signal is therefore formed in the present exemplary embodiment from the magnitude of the Fourier-transformed structure-borne sound oscillation signal.

A sum of the quotients of the current evaluation signal and oscillation evaluation signal is formed from the current evaluation signal and the oscillation evaluation signal for the frequencies $3f_o$, $4f_o$, $5f_o$ and $6f_o$, with the quotients in each case being formed for common frequencies for the current evaluation signal and the oscillation evaluation signal. This sum of quotients for discrete frequencies forms a good radiation measure for assessment of a thermal radiation from an arc onto a wall of a furnace vessel, or an envelope of an arc which is burning between an electrode and material to be melted through material to be melted, for example solid material or foamed slag.

Figure 4:
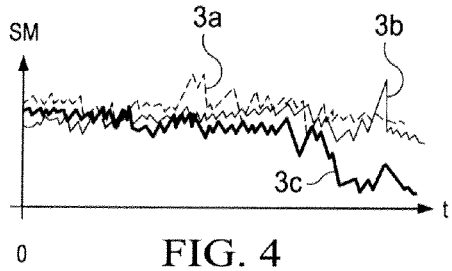
FIG. 4 shows an illustration of a radiation measure over time.

FIG. 4 shows a time profile of a radiation measure SM during operation of an arc furnace for various electrodes 3a, 3b, 3c as a function of time t. As can be seen from the illustration in FIG. 4, the radiation measure SM fluctuates at the start—within the range of the fluctuations which occur—by a small amount about a relatively constant level. In the present illustration of the radiation measure, this level means that the arc is enveloped by material to be melted. For longer times t, it can be seen that the radiation measure SM for the electrode 3c falls sharply. The arc of this electrode 3c is burning freely. This can be caused, for example, by a scrap-metal pile enveloping the arc collapsing or melting away. A change in the foamed slag level or the vertical electrode position can also initiate the poorer arc envelope and therefore the increased radiation measure. However, in general, the reason for the free burning can be identified clearly by matching to other data that is available for the arc and/or for the arc furnace, for example electrical data, the time which has passed since the start of the melting process, temperature data, concentration measurements for substances in the dust extraction, etc. A freely burning arc can now be identified on the basis of the determined radiation measure. A freely burning arc can therefore be counteracted better, in particular more quickly.

Figure 5:
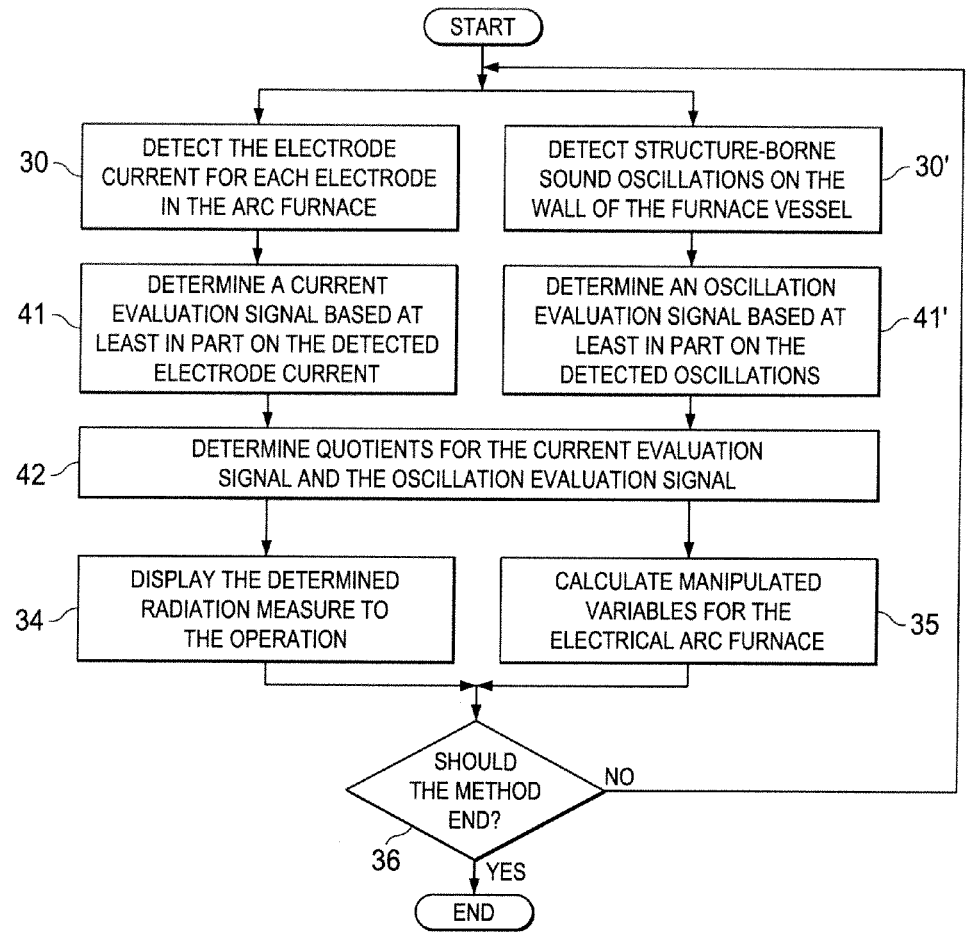
FIG. 5 shows a flowchart in order to illustrate the schematic procedure in a method for determining a radiation measure.

FIG. 5 shows a flowchart which illustrates an example of a procedure for the method. This is based on the assumption that the arc furnace is in operation and that an arc has been provided and has been formed between the electrode and the solid material, in order to melt the solid material.

First of all, the electrode current for each electrode in the arc furnace is detected in a method step 30. At the same time, structure-borne sound oscillations are detected by means of structure-borne sound sensors on a wall of the furnace vessel, in a method step 30'. The structure-borne sound oscillations on the wall of the furnace vessel are excited by the pulsating arc.

A current evaluation signal is then determined from the detected electrode current in a method step 41, for example in the form of the absolute magnitude of a Fourier-transformed squared electrode current or of a Fourier-transformed squared magnitude of the electrode current. The detected structure-borne sound oscillation signal is transformed from the time domain to the frequency time at a time in parallel with this in a method step 41', and a magnitude of the transformed, complex structure-borne sound oscillation signal is then determined.

The frequencies for which a quotient is intended to be formed are preferably defined before the start of the method. These are preferably multiples of twice the operating frequency of an electrode.

Quotients of the frequency-dependent current evaluation signal and the frequency-dependent oscillation evaluation signal are then determined for the respective frequencies in a method step 42. A sum of quotients is then formed from these quotients in a method step 43 for a plurality of different frequencies, which are common to the respective quotients, and on which the radiation measure is essentially based. In addition, weighting factors can be provided for different quotients, in order, if required, to adapt the radiation measure for a specific electrical arc furnace, which is characterized by a physical specific type. In addition, further scaling factors can be used for the radiation measure in order to obtain an even more valid representation of the radiation measure.

On the one hand, the determined radiation measure is preferably displayed in graphic form to the operator of the arc furnace, in a method step 34. On the other hand, manipulated variables for the electrical arc furnace are calculated from the radiation measure in a method step 35, which is carried out in parallel with this, in order to advantageously intervene in the melting process. A check is then carried out in a method step 36 to determine whether the method should be ended. If this is not the case, for example because the melting process has not yet been completed, then the method is continued until the method should be ended.

The outputting of information relating to the radiation measure to the operator as well as the control and/or regulation of the arc furnace on the basis of the radiation measure are optional components of the method.

What is claimed is:

1. A method for determining a radiation measure for thermal radiation which originates from an arc and strikes a boundary of the arc furnace, using a signal processor, wherein the arc burns between an electrode and a material to be melted, comprising:
   detecting an electrode current which is supplied to the electrode,
   detecting structure-borne sound oscillations of the arc furnace,
   determining with the signal processor a current evaluation signal, which is associated with a frequency range of the detected electrode current, based at least in part on the detected electrode current,
   determining with the signal processor an oscillation evaluation signal which is associated with a frequency range of the detected structure-borne sound oscillations, based at least in part on the detected structure-borne sound oscillations, and
   calculating with the signal processor a quotient of the oscillation evaluation signal and current evaluation signal as a radiation measure for at least one frequency which is common to the detected electrode current and the detected structure-borne sound oscillations.

2. The method according to claim 1, wherein a sum of quotients which are formed for a plurality of common frequencies, is formed as the radiation measure.

3. The method according to claim 2, wherein at least one of the plurality of common frequencies is selected from the group which consists of the multiples of twice the operating frequency of the electrode.

4. The method according to claim 1, wherein the frequency-dependent current evaluation signal is based on $$I_n(\omega) \propto \int_a^b I(t)^n e^{-i\omega t} dt$$

or on $$I_n(\omega) \propto \int_a^b |I(t)|^n e^{-i\omega t} dt$$

where n is a parameter, n ∈ 1, 2, 3, ...
where i: imaginary unit
where e: Euler's number
where t: time
where ω: angular frequency of the electrode current
where I(t): time-dependent, detected electrode current
where I(w): frequency-dependent electrode current
where a: start of the integration interval
where b: end of the integration interval.

5. The method according to claim 4, wherein n for $$I_n(\omega) \propto \int_a^b I(t)^n e^{-i\omega t} dt$$

is selected to be equal to two.

6. The method according to claim 1, wherein n for $$I_n(\omega) \propto \int_a^b I(t)^n e^{-i\omega t} dt$$

is selected to be equal to one.

7. The method according to claim 1, wherein the frequency-dependent current evaluation signal is formed as the frequency-dependent absolute magnitude $|I_n(\omega)|$ $\sqrt{I_n(\omega) \cdot I_n(\omega)^*}$ of the function $I_n(\omega)$.

8. The method according to claim 1, wherein the frequency-dependent oscillation evaluation signal is formed as the frequency-dependent absolute magnitude $|K_n(\omega)|$ $\sqrt{K_n(\omega) \cdot K_n(\omega)^*}$ of the function:

$$K_n(\omega) \propto \int_a^b K(t)^n e^{-i\omega t} dt$$

where n is a parameter, n ∈ 1, 2, 3, ...
where i: imaginary unit
where e: Euler's number
where t: time
where ω: angular frequency of the detected structure-borne sound oscillations
where K(t): time-dependent, detected structure-borne sound signal
where K(ω): frequency-dependent structure-borne sound signal
where K(ω)*: complex-conjugate structure-borne sound signal relating to K(ω)
where a: start of the integration interval
where b: end of the integration interval.

9. The method according to claim 1, wherein the radiation measure is used for at least one of: controlling and regulating a process variable of the arc furnace.

10. A signal processing device for an arc furnace, having a machine-legible program code which has control commands which cause the signal processing device to:
   detect an electrode current which is supplied to an electrode,
   detect structure-borne sound oscillations of the arc furnace,
   determine a current evaluation signal, which is associated with a frequency range of the detected electrode current, from the detected electrode current,
   determine an oscillation evaluation signal which is associated with a frequency range of the detected structure-borne sound oscillations from the detected structure-borne sound oscillations, and
   form a quotient of the oscillation evaluation signal and current evaluation signal as a radiation measure for at least one frequency which is common to the detected electrode current and the detected structure-borne sound oscillations.

11. A non-transitory computer readable storage medium containing computer instructions stored therein for causing a computer processor to:
  detect an electrode current which is supplied to the electrode,
  detect structure-borne sound oscillations of the arc furnace,
  determine a current evaluation signal, which is associated with a frequency range of the detected electrode current, from the detected electrode current,
  determine an oscillation evaluation signal which is associated with a frequency range of the detected structure-borne sound oscillations from the detected structure-borne sound oscillations, and
  form a quotient of the oscillation evaluation signal and current evaluation signal as a radiation measure for at least one frequency which is common to the detected electrode current and the detected structure-borne sound oscillations.

12. The storage medium according to claim 11, wherein a sum of quotients which are formed for a plurality of common frequencies, is formed as the radiation measure.

13. An arc furnace comprising at least one electrode, having an electrode current detection device for detecting an electrode current which is supplied to the at least one electrode, having structure-borne sound sensors for detecting structure-borne sound in a boundary of the arc furnace, and having a signal processing device according to claim 10, wherein the electrode current detection device and the structure-borne sound sensors are operatively connected to the signal processing device.

14. The arc furnace according to claim 13,
  wherein the signal processing device is operatively connected to at least one of a control and a regulating device for determining a manipulated variable for a process variable of the arc furnace from the radiation measure.

15. The arc furnace according to claim 13, wherein the signal processing device forms a sum of quotients which are formed for a plurality of common frequencies as the radiation measure.

16. The arc furnace according to claim 15, wherein at least one of the plurality of common frequencies is selected from the group which consists of the multiples of twice the operating frequency of the electrode.

17. The arc furnace according to claim 13, wherein the frequency-dependent current evaluation signal is based on $$I_n(\omega) \propto \int_a^b I(t)^n e^{-i\omega t} dt$$

or on $$I_n(\omega) \propto \int_a^b |I(t)|^n e^{-i\omega t} dt$$

where n is a parameter, n∈1, 2, 3, . . .
where i: imaginary unit
where e: Euler's number
where t: time
where $\omega$: angular frequency of the electrode current
where I(t): time-dependent, detected electrode current
where I($\omega$): frequency-dependent electrode current
where a: start of the integration interval
where b: end of the integration interval.

18. The arc furnace according to claim 17, wherein n for $$I_n(\omega) \propto \int_a^b I(t)^n e^{-i\omega t} dt$$

is selected to be equal to two.

19. The arc furnace according to claim 13, wherein n for $$I_n(\omega) \propto \int_a^b I(t)^n e^{-i\omega t} dt$$

is selected to be equal to one.

20. The arc furnace according to claim 13, wherein the frequency-dependent current evaluation signal is formed as the frequency-dependent absolute magnitude $|I_n(\omega)|$ $\sqrt{I_n(\omega) \cdot I_n(\omega)^*}$ of the function $I_n(\omega)$.

* * * * *